United States Patent [19]

Irvin

[11] Patent Number: 4,722,568
[45] Date of Patent: Feb. 2, 1988

[54] VEHICLE INFANT SAFETY SEAT

[76] Inventor: Michael J. Irvin, 634 East Maryland St., Evansville, Ind. 47711

[21] Appl. No.: 863,293

[22] Filed: May 15, 1986

[51] Int. Cl.⁴ .............................................. A47C 15/00
[52] U.S. Cl. ................................... 297/238; 297/112; 297/487
[58] Field of Search ............... 297/238, 117, 112, 115, 297/487

[56] References Cited

U.S. PATENT DOCUMENTS

| | | | |
|---|---|---|---|
| 2,988,135 | 6/1961 | Caminiti | 297/487 X |
| 4,533,176 | 8/1985 | Wittenbach | 297/238 |
| 4,540,216 | 9/1985 | Hassel, Sr. | 297/238 |
| 4,596,420 | 6/1986 | Vaidva | 297/238 |

FOREIGN PATENT DOCUMENTS 2720954 10/1977 Fed. Rep. of Germany ...... 297/238
2,307,673 11/1976 France ................................ 297/238

*Primary Examiner*—James T. McCall
*Attorney, Agent, or Firm*—Warren D. Flackbert

[57] ABSTRACT

A vehicle infant safety seat characterized by an infant receiving cavity which is concealed in a non-use condition, and conversely. The aforesaid cavity includes cushioning, for infant comfort, and a retaining cover for positive cushioning placement in a non-use condition, such also serving protective purposes during a use condition. The instant infant safety seat is typically positioned in the mid-region of the back seat of the vehicle, as in the customary location of an arm rest. Belting and/or webbing, and a safety bar, are provided to selectively assure and limit infant movement.

7 Claims, 4 Drawing Figures

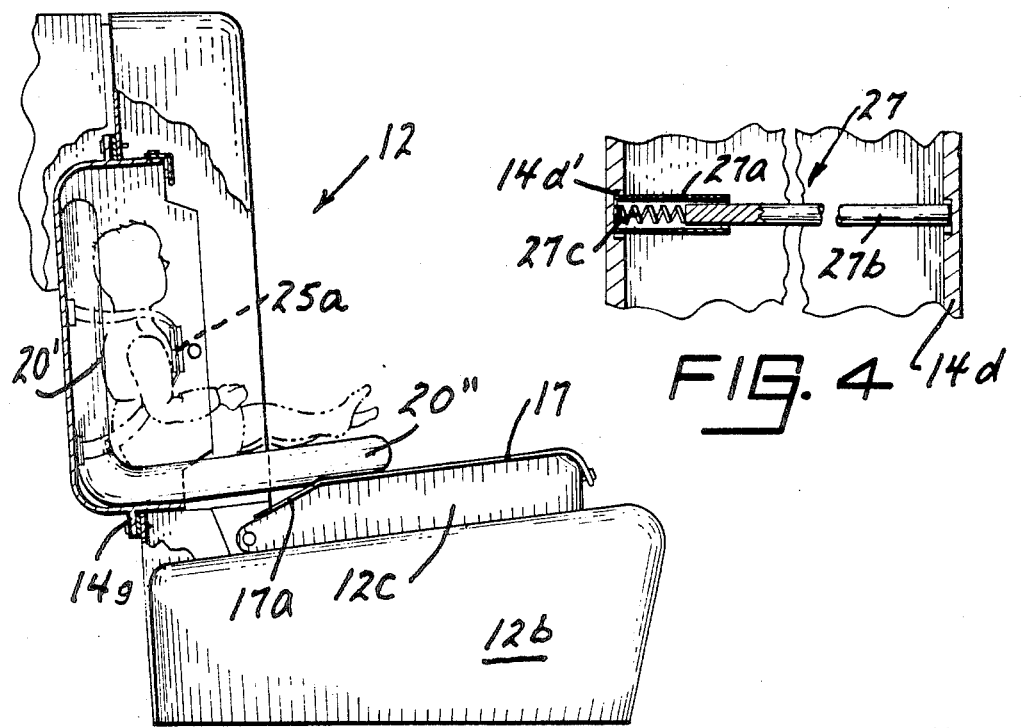
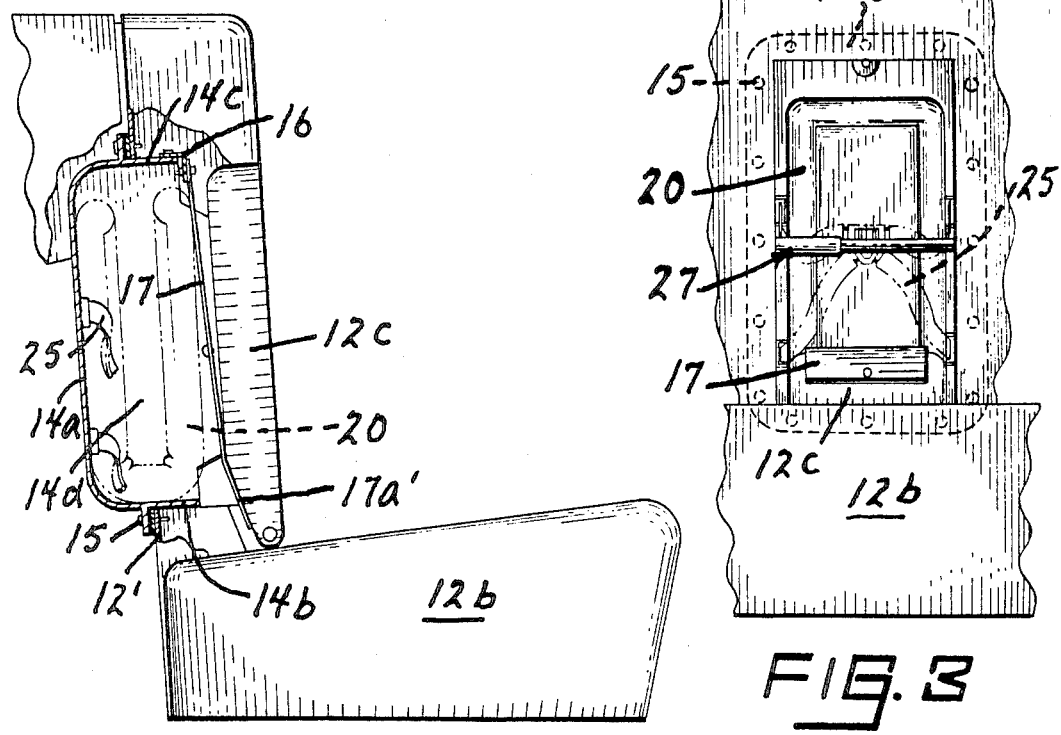

VEHICLE INFANT SAFETY SEAT

As is known, safety for youngsters while in a moving vehicle, such as an automobile, is of continuing concern, even to the extent of requiring specialized infant seats for the very young. The latter, being movable into and from a location within the vehicle, serve importance, however, the invention simplifies infant safety seating by utilizing already available space presented by the customary vehicle rear seat structure. In this connection, the vehicle infant safety seat presented herein is adapted for use in the area normally occupied by the rear seat pivotal arm rest.

More particularly, but briefly, the invention provides for infant seating within a cavity disposed at the mid-area of the back of the back seat of a vehicle, where, when not in use, the cavity is concealed by a pivotal back support member. The cavity includes cushioning and/or padding along its rear and bottom walls, where such padding extends onto and over a portion of the inner surface of the back support member to serve infant leg supporting purposes.

Additionally, customary webbing and/or belting, with an associated release buckle, is provided, together with a safety bar selectively received within recesses in the side walls of the cavity. The safety bar affords added steadying power for the infant while in transit.

In any event, a better understanding of the present invention will become more apparent from the following description, taken in conjunction with the accompanying drawing, wherein FIG. 1 is a view in side elevation, partly in vertical section, showing a vehicle infant safety seat in accordance with the teachings of the present invention, with such being shown in a use condition and the infant represented by phantom lines;

FIG. 2 is another view in side elevation, comparable to that of FIG. 1, but showing the instant vehicle infant safety seat in a non-use condition;

FIG. 3 is a view in front elevation, looking from right to left in FIG. 1, detailing the invention; and, FIG. 4 is an enlarged view, partly fragmentary and partly in section, showing a typical safety bar installation.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the vehicle infant safety seat of the invention is shown at a location, typically but not so limited, in the mid-area of the back portion 12a of the rear seat structure 12 of a vehicle, where such structure 12 includes a seat portion 12b. In other words, the instant safety seat could be located in the area which normally receives the conventional pivotal arm rest.

In any event, the invention is defined by a cavity 14 including a rear wall 14a, a bottom wall 14b, a top wall 14c and side walls 14d, integrally formed from a plastic resin, for example. A flange 14g extends outwardly around the cavity 14, where securing means 15, as a locking device or pin, position the cavity 14 on frame 12' for the rear seat structure 12 (see FIGS. 1 and 3).

In a non-use condition (FIG. 2), a pivotal member 12c, similar in form to a common arm rest, conceals the cavity 14. A retaining/protective cover 17, typically a flexible fabric, releasably detached to a downwardly extending clip 16 secured onto the cavity 14, includes an end 17a which is affixed to a portion of the upper surface of the pivotal member 12c, as at 17a'. When the pivotal member 12c is moved to a use condition (see FIG. 1), the retaining/protective cover 17 is released and overlies the upper surface of the pivotal member 12c, i.e. to minimize soil and wear.

As should be evident in FIGS. 1 and 2, padding and/or cushioning 20, either loose or fixed, is provided within the cavity 14, being in portions folded towards each other in a non-use condition (FIG. 2) and in a generally L-shape, in side elevation, when in use (see FIG. 1). The cushioning/padding 20, which is positioned by retaining/protective cover 17 at the non-use position, serves back rest purposes, at 20', and leg supporting purposes, at 20".

Additionally, belting and/or webbing 25, with an associated release mechanism 25a, is provided to overlie the body of the infant during the use condition of FIG. 1. The belting/webbing 25 serves a purpose similar to that of a conventional seat belt.

A safety bar 27 may also be provided, extending between the side walls 14d of the cavity 14. The safety bar 27 is releasably positioned and, at a use position, is forwardly of the infant, serving added steadying and assurance while the infant is in transit. The safety bar 27 is shown in FIG. 3, where, typically, and as more evident in FIG. 4, such comprises telescopic portions 27a-27b urged into recesses 14d' in side walls 14d of the cavity 14 by a spring member 27c. In other words, safety bar 27 is readily positioned and removed, as desired.

As evident from the preceding, the vehicle infant safety seat of the invention effectively utilizes available space within a standard automobile, serving for the ready placement and securement of an infant during transporting. The safety seat is concealed from view when not in use but, on the other hand, is readily available for use upon the pivoting of member 12c. The cushioning/padding 20 serves comfort reasons, while the webbing/belting 25, and the safety bar 27, selectively assure and limit infant movement.

The vehicle infant safety seat described hereabove is susceptible to various changes within the spirit of the invention, including proportioning; the desired location within the vehicle; the precise shape of the cavity; the use and positioning of the safety bar; and, the like. Thus, the preceding should be considered illustrative and not as limiting the scope of the following claims.

I claim:

1. An infant safety seat disposed on the framework of a vehicle comprising an infant receiving cavity recessed within the rear portion of a seat of said vehicle, and a pivotal member secured to said seat serving infant receiving cavity concealment at a first position and leg support at a second position, where said infant receiving cavity includes independent cushioning, and where a releasable and flexible cover selectively secured to said infant receiving cavity serves to maintain said independent cushioning in a folded condition at said first and said second position of said pivotal member.

2. The infant safety seat of claim 1 where said pivotal member also selectively serves arm support at said second position.

3. The infant safety seat of claim 1 where an end of said releasable and flexible cover is secured to a portion of said pivotal member.

4. The infant safety seat of claim 3 where said releasable and flexible cover overlies the upper surface of said pivotal member in a protective relationship at said second position of said pivotal member.

5. The infant safety seat of claim 1 where said pivotal member is flush with the front surface of said rear portion when at said first position.

6. The infant safety seat of claim 1 where a releasable safety bar is selectively secured to opposite side walls of said infant receiving cavity.

7. The infant safety seat of claim 1 where safety webbing is secured to said infant receiving cavity in a selective overlying relationship with the infant.

* * * * *